(12) United States Patent
Jen et al.

(10) Patent No.: US 7,228,362 B2
(45) Date of Patent: Jun. 5, 2007

(54) OUT-OF-ORDER SERVICING OF READ REQUESTS WITH MINIMAL ADDITIONAL STORAGE

(75) Inventors: Michelle C. Jen, Sunnyvale, CA (US); Debendra Das Sharma, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 518 days.

(21) Appl. No.: 10/815,899

(22) Filed: Mar. 31, 2004

(65) Prior Publication Data

US 2005/0223123 A1 Oct. 6, 2005

(51) Int. Cl.
*G06F 3/00* (2006.01)
*G06F 13/00* (2006.01)

(52) U.S. Cl. ............................. 710/6; 710/54; 710/310

(58) Field of Classification Search ................ 710/5–7, 710/54, 310–311; 711/137–151
See application file for complete search history.

(56) References Cited

U.S. PATENT DOCUMENTS

| | | | |
|---|---|---|---|
| 6,182,192 B1 * | 1/2001 | Rovati | 711/111 |
| 6,272,600 B1 * | 8/2001 | Talbot et al. | 711/140 |
| 6,559,850 B1 * | 5/2003 | Strongin et al. | 345/520 |
| 6,889,295 B2 * | 5/2005 | Watts | 711/151 |
| 6,892,281 B2 * | 5/2005 | Chaudhari et al. | 711/137 |
| 2004/0024948 A1 * | 2/2004 | Winkler et al. | 710/311 |
| 2004/0111567 A1 * | 6/2004 | Anderson et al. | 711/149 |

* cited by examiner

*Primary Examiner*—Christopher Shin
(74) *Attorney, Agent, or Firm*—Philip A. Pedigo (57) ABSTRACT

Various embodiments of the invention relate to an apparatus and method for efficiently implementing out-of-order servicing of read requests originating from an input/output (I/O) interface with minimal additional storage. For example, a number of read entries may be generated from data read requests stored in a first-in-first-out in a first order. The read entries are stored in a storage device and each read entry identifies internal data reads to read data to service the data read request to which the read entry corresponds. A controller coupled to the storage structure may then submit the internal data reads a central arbiter to read data in a second order that is different than the first order. Moreover, the controller also allows the second order to include internal data reads from one read entry, before a completing servicing of another partially serviced read entry, thus providing "simultaneous" servicing of several read entries.

20 Claims, 6 Drawing Sheets

OUT-OF-ORDER SERVICING OF READ REQUESTS WITH MINIMAL ADDITIONAL STORAGE

FIELD

Embodiments of the invention relate to servicing of data read requests received from any input/output (I/O) interface.

BACKGROUND

Read requests coming from an input/output (I/O) interface such as peripheral components interconnect (PCI), peripheral components interconnect extended (PCI-X), or peripheral components interconnect express (PCI-E) to the northbridge chipset are served using an in-order scheme. Thus, when multiple requests are received, data is returned to complete servicing of one request before beginning to return data associated with a subsequent request. However, this in-order return of data has a major shortcoming. One example is if a PCI-E to PCI-X bridge chip is hooked to a northbridge chip. Here, one PCI card may request large data payloads in every request whereas another PCI card may request smaller payloads. Thus, in an in-order scheme, the card requesting larger payloads may get an unfair share of the servicing bandwidth since each of its requests delivers higher completion payload. The proposed invention gets around this limitation by employing a round-robin, out-of-order payload delivery scheme between the various requests queued in the request queue in the chipset.

DETAILED DESCRIPTION

Figure 1:
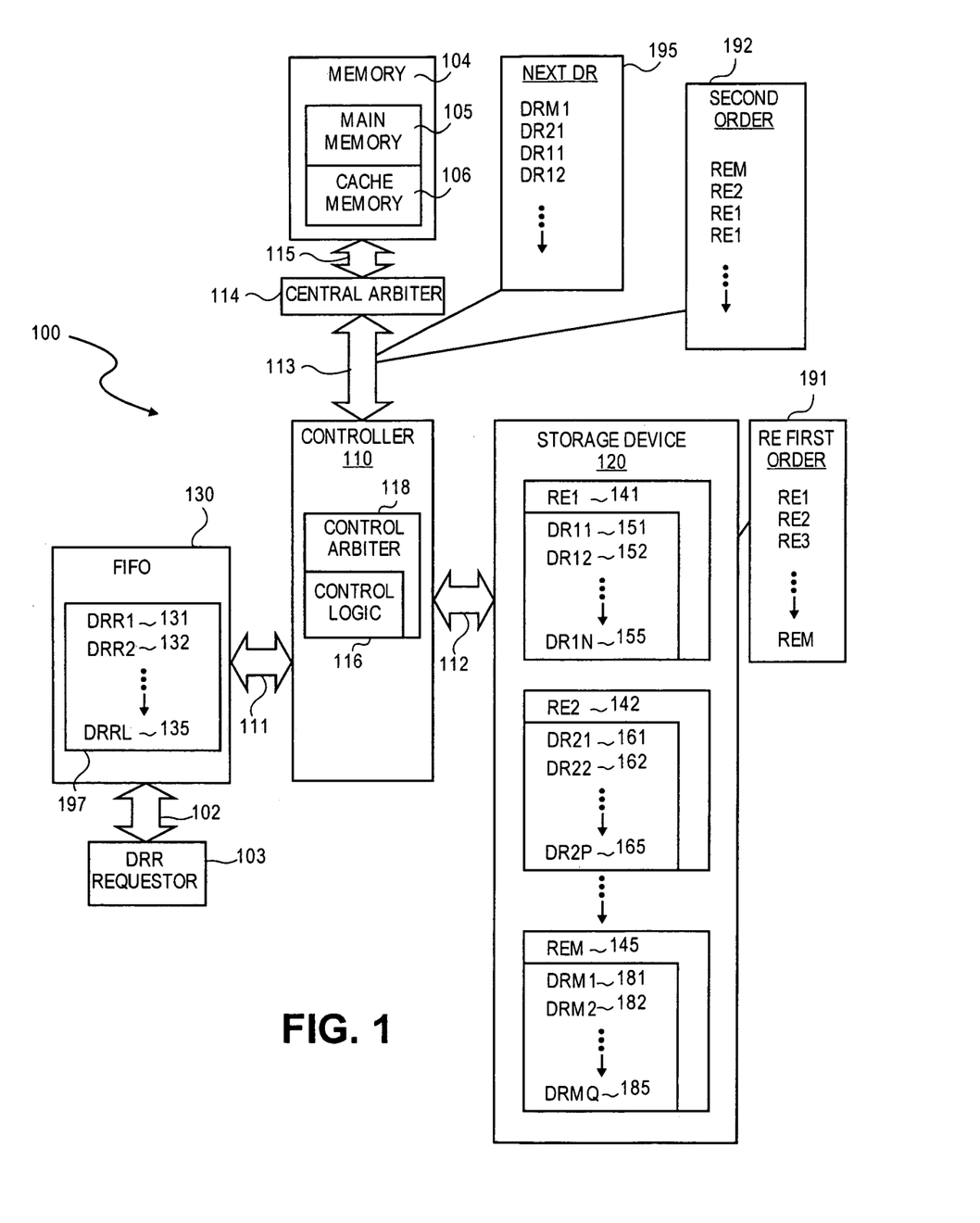
FIG. 1 is a block diagram of an apparatus for out-of-order servicing of read requests, according to one embodiment of the invention.

Various embodiments of the invention relate to an apparatus and method for efficiently implementing out-of-order servicing of read requests originating from a communication link such as a PCI-E link, while requiring minimal additional storage as compared to an in-order servicing scheme. Thus, the scheme described below may impart more servicing fairness or equity between individual request streams for servicing and link bandwidth, where some streams generate substantially larger requests than other streams. For example, FIG. 1 is a block diagram of an apparatus for out-of-order servicing of read requests, according to one embodiment of the invention. FIG. 1 shows a system for out-of-order servicing of read requests, such as apparatus 100 having storage structure 120, linked (e.g., such as by being coupled via at least one electronically conductive path) to controller 110, where controller 110 is linked to first-in-first-out (FIFO) 130 which is linked to input/output (I/O) interface 102. Controller 110 is also linked to central arbiter 114 which is linked to memory 104. FIG. 1 shows FIFO 130 coupled to controller 110 via data path 111, and controller 110 coupled to storage device 120 via data path 112. Internal controller 110 is coupled to central arbiter 114 via data path 113. Central arbiter 114 is coupled to memory 104 via data path 115. Data paths 111, 112, 113, and/or 115 may be any of various digital or analog electronic data paths such as a data bus, link, line, wire, printed circuit board trace, etc.

According to embodiments, data read requests ("DRR" herein) DRR1 131 through DRRL 135 may be data read requests received from I/O interface 102, such as those originating from or passing through DRR requester 103. It is contemplated that data read requester 103 may be one or more data read requesters, where each requester can be a device, a chip, a card, a communication link, a communication bus, a communication node, an asynchronous communication link, a PCI link, a PCI-E link, any digital computing entity that supports asynchronous communication, and/or a system or bridge capable of interfacing a PCI protocol bus or device with a PCI-E link. For example, DRR1 131 through DRRL 135 may be incoming data read requests or up to 4,000 bytes worth of data to be read in "n" number of internal cache line size requests where "n" is the data read request size divided by the cache line size supported by the chip or device to perform the data read (e.g., such as the cache line size supported by the central arbiter of the chip or device). Specifically, FIFO 130 may store a plurality of such data read requests in data read request first order 197, such as the order DRR1 131, DRR2 132, ... DRRL 135. For instance, FIFO 130 may be implemented using a compact register file memory structure that allows read access to any of the data read requests, DRR1 131 through DRRL 135, stored in FIFO 130. It may be appreciated that each DRR stored in FIFO 130 may be stored until completion, and then removed from FIFO 130 according to various processes and priorities. Moreover, each DRR may include various information and/or have various bit sizes, depending on the protocol implemented. For example, for a PCI-E link each DRR may include 128 bits of information to completely capture all the information needed to process the data read requests for up to 4,000 bytes of data, as defined by the PCI-E Specification, PCI Express Base Specification, Revision 1.0a, published Apr. 15, 2003 (published by PCI-Special Interest Group (SIG) Administration, Portland Oregon). Although embodiments of the invention are described herein in the context of the PCI-E specification, the same concept can be extended to be used with any other communication I/O, protocol, link, or for a specification thereof with data payloads having a maximum payload greater than or different than 4,000 bytes worth of data.

Storage structure 120 may store plurality of read entries ("RE" herein) RE1 141, RE2 142, through REM 145, where the read entries are stored in a first order, such as is shown by RE first order 191, such as the order RE1 141, RE2 142, ... through REM 145. For example, read entries RE1 through REM could be derived from plurality of data read requests DRR1 131, DRR2 132, through DRRL 135, which are stored in FIFO 130 and stored in DRR first order 197. As noted, FIG. 1 shows DRR first order 197 having DRR1, DRR2, through DRRL; and RE first order 191 including the order RE1, RE2, through REM. Hence, FIFO 130 may store a plurality of data read requests in data read request first order 197, which may or may not be a similar order to RE first order 191. In some cases, FIFO 130 may store DRR1 131 through DRRL 135 in data read request first order 197, while storage device 120 stores a number of read requests corresponding to all or a subset of DRR1 131 through DRRL 135 in the same order. In other words, RE first order 191 can contain, in the order which they correspond, the top "x" requests of data read request first order 197.

Thus, storage device 120 includes information for entries RE1 141 through REM 145 including information identifying DR11 151 through DRMQ 185. Note that according to embodiments, storage structure 120 may include standard memory cell logic, data buffers, input output units, request blocks, input output unit queues, cache line buffers, and/or memory such as memory 104.

For instance, controller 110 may derive each read entry RE1 141 through REM 145 from a corresponding data read request of DRR1 131 through DRRL 135, where each read entry includes, identifies, and/or defines at least one data read (DR) to service the corresponding DRR. Accordingly, storage device 120 is shown having RE1 141, where RE1 141 identifies DR11 151, DR12 152 through DR1N 155. In addition, storage device 120 includes DR21 161, DR22 162 through DR2P 165 identified by RE2 142. Similarly, REM 145 identifies DRM1 181, DRM2 182, through DRMQ 185. For example, each of RE1 141 through REM 145 may correspond to one of DRR1 131 through DRRL 135, and include at least one DR that is sufficient to complete, satisfy, and/or fulfill servicing of the corresponding DRR. Thus, RE1 141 may correspond with DRR1 131, and RE1 141 may include DR11 151, DR12 152 through DR1N 155, where DR11 151 through DR1N 155 are sufficient to complete servicing of DRR1 131. Similarly, RE2 142 through REM 145 may correspond to other DRRs stored in FIFO 130 in sequence, such as DRR2 132 through "DRRM" where DRRM is the Mth DRR from the top of FIFO 130 in first in sequence. It is contemplated that "M" will be equal to or less than "L", such that storage device 120 will have REs for all of, or a subset of the DRRs stored in FIFO 130. However, storage device 120 will not have REs corresponding to DRRs not currently stored in FIFO 130.

According to embodiments each DR may be an internal data read, such as an internal data read to be submitted to a central arbiter, a memory and/or a digital communication chip. For example, any or all of DR11 151 through DRMQ 185 may be submitted by controller 110 via data path 113 to central arbiter 114 to perform data reads. Central arbiter 114 may be a central arbiter of a digital communication chip. FIG. 1 shows memory 104 including main memory 105 and cache memory 106. It is contemplated that memory 104 may include various types of memory and/or have various architectures, such as by including one or more of the following: internal memory, local memory, on-chip memory, on-board memory, computer memory, random access memory, read only memory, main memory, cache memory, and/or memory of a chip or device for communicating or satisfying data read requests.

Thus, controller 110 may select various DRRs stored at FIFO 130 and derive and store REs corresponding to those DRRs at storage device 120 to submit various DRs, such as numbers of DR11 151 through DRMQ 185, in a different second order, such as an order different than RE first order 191 and/or DRR first order 197. Specifically, for example, controller 110 may use data paths 111 and 112 to select various DRR and store various REs at storage device 120 and then submit various DRs from storage device 120 to central arbiter 114 via data path 113 in different second order 192 as compared to either RE first order 191 or DRR first order 197. Central arbiter 114 may then submit requests to read data from memory 104 via data path 115 as appropriate to satisfy the DRs. Specifically, FIG. 1 shows second order 192, including order REM, RE2, RE1, RE1, etc. . . . that may be an order of data read submitted to central arbiter 114 by controller 110. More particularly, by submitting a plurality of DRs from storage device 120 to central arbiter 114 to read data from memory 104, controller 110 is able to service internal data reads from one RE, before completing servicing of another partially serviced read entry, thus providing "simultaneous" servicing of more than one RE stored in storage device 120, and thus, also providing simultaneous servicing of more than one DRR stored in FIFO 130. For instance, controller 110 is able to service RE1 141 through REM 145 simultaneously, and thus also simultaneously service whichever DRRs stored in FIFO 130 correspond to RE1 141 through REM 145 (e.g., such as if M=4 and DRR1–DRR4 correspond to RE1–RE4). More particularly, controller 110 may service DRM1 181 from REM 145, then DR21 161 from RE2 142, then DR11 151 from RE1 141, and then DR12 152 from RE1 141.

According to embodiments, controller 110 may include control arbiter 118, such as an arbiter having logic, such as control logic to perform various functions described herein. For example, FIG. 1 shows controller 110 having control arbiter 118 with control logic 116 to perform functions of controller 110 described herein. Thus, control logic 116 may be used to perform selection of DRR from FIFO 130, derivation of REs to be stored on storage device 120 and storage thereof, submission of DRs from storage device 120 in second different order 192, and/or simultaneous servicing of DRs stored on storage device 120.

For instance, control logic 116 may include logic to implement an arbitration scheme (e.g., the arbitration scheme for control arbiter 118) to select a next data read from the data read stored on storage device 120 to service. More particularly, FIG. 1 shows next DR 195 having DRM1, DR21, DR11, DR12, etc. . . . that may be an order "next" internal reads to be read next and corresponding with second order 192. According to embodiments, although the order of REs may vary or be interleaved from which DRs are submitted, the order of DRs submitted for each RE is sequential. Thus, although next DR 195 is DRM1, DR21, DR11, DR12, each RE must submit its first DR (e.g., such as DR11 for RE1) before submitting the next DR (e.g., such as DR12 for RE1). Therefore, next DR 195 may be submitted to central arbiter 114 by controller 110 from the plurality of data reads DR11 151 through DRMQ 185 stored on storage device 120, where the DRs stored on storage device 120 are ordered according to RE first order 191. Note that it is considered that RE first order 191 may be one or more read entries that correspond to a top subset of DRRs of FIFO 130 (e.g., correspond to a subset of first in DRRs of DRR first order 197).

In accordance with embodiments, central arbiter 114 or the functionality thereof, may be incorporated into control arbiter 118. For example, the functions and/or structure of central arbiter 114 as described herein may be part of control arbiter 118 such that internal controller 110 is coupled to memory 104 via data path 115 and data path 113 does not exist. Thus, fetches and prefetches issued or submitted to central arbiter 114 would be internal to controller 110 until central arbiter 114 issued data reads to memory 104 via data path 115.

Figure 2:
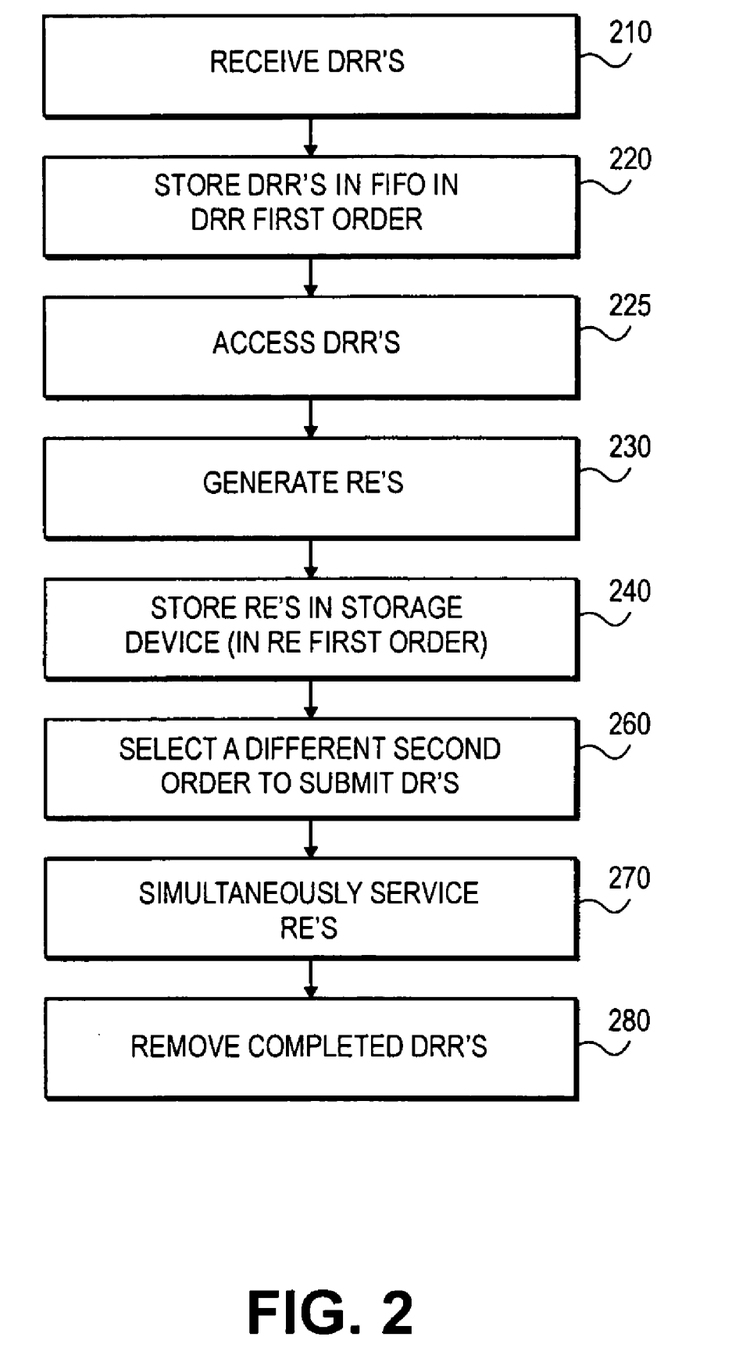
FIG. 2 is a flow diagram of a process for out-of-order and simultaneous servicing of read requests, in accordance with one embodiment of the invention.

Selection of a DR order for next data read 195 may be implemented by a process, such as a process that may correspond to the arbitration scheme described above for control logic 116. For instance, one process for selecting the order for next data read 195 is described below with respect to FIGS. 2–5, where FIG. 2 is a flow diagram of a process for out-of-order and simultaneous servicing of read requests, in accordance with one embodiment of the invention. At block 210 data read requests (DRRs) may be received (e.g., such as by being received by FIFO 130 of apparatus 100 as described with respect to FIG. 1).

At block 220, the DRRs are stored in a FIFO in a DRR first order (e.g., such as by storing DRR1 131 through DRRL 135 in FIFO 130 as described with respect to FIG. 1).

At block 225, the DRRs are accessed, such as by accessing a number of DRRs received from an I/O interface and stored in a first order. For example, as described above, controller 110 may access a plurality of DRRs stored at FIFO 130 via data link path 111.

At block 230, a number of read entries (REs) are generated from the plurality of DRRs, such as a number of read entries, each identifying a plurality of internal data reads to read data to service the plurality of DRRs. For example, the plurality of REs generated may correspond to a subset of the plurality of DRRs, such as is described above with respect to RE1 141 through REM 145 corresponding to all or a subset of DRR1 131 through DRRL 135. Moreover, each DR (e.g., such as each of DR11 151 through DRMQ 185) may be an internal data read to read one cache line size read of data from a central arbiter (e.g., such as to read one cache line as defined by the internal cache line size supported by central arbiter 114) and to correspond to a DRR (e.g., such as many of DRR1 131 through DRRL 135) which requests a total number of cache lines for a data read requester (e.g., such as DRR requester 103). For example, each DRR may request up to 4,000 bytes worth of data to be read in a "n" number of internal cache line size requests where "n" is the data read request size divided by the cache line size supported by central arbiter 114. According to embodiments, by the internal cache line size supported by central arbiter 114 may or may not equal by the internal cache line size supported by control arbiter 118. Thus, it is contemplated that each DR may have request an internal data read size equal to the product of an integer and the cache line size read of data for the central arbiter 114 and/or control arbiter 118. Specifically, each of DR11 151 through DRMQ 185 may request the same selected data read size, which is equal to the cache line sized read allowed by central arbiter 114.

In addition, according to embodiments, each RE (e.g., such as RE1 141 through REM 145) may include information identifying: (1) whether the read entry has valid data, (2) a total number of cache lines requested by a data read request, (3) an identification of a portion of the total number of cache lines already serviced by data fetches (e.g., this total number may be used as an address offset, when issuing a fetch DR from this RE), (4) identification of a portion of the total number of cache lines already serviced by data prefetches (e.g., this total number may be used as an address offset when issuing a prefetch DR from this RE), and (5) a status of prefetches already serviced for the read entry. More particularly, for example, as described above, controller 110 may select numbers of DRR1 131 through DRRL 135 from FIFO 130 and generate RE1 141 through REM 145 having DR11 151 through DRMQ 185 which represent "n" number of internal cache line sized requests to satisfy each DRR where "n" is the request size of each DRR divided by the cache line size read allowed by central arbiter 114, and the DRs for each of RE1 141 through REM 145 are sufficient to satisfy the DRR to which the RE corresponds. Thus, in an example where DRR1 131 requests an 8 cache line read (e.g., here n=8) and DRR2 132 requests an 4 cache line read (e.g., here n=4), if four DRs are submitted corresponding to DRR1 131, and then four DRs are submitted corresponding to DRR2 132, then, DRR2 132 will be satisfied before satisfaction of DRR1 131.

Note that information for each DR need not be stored as a separate entity. For example, each RE may contain or store 15 bits of data having information identifying or corresponding to the DRs for that RE, such as one bit of data indicating whether or not the information stored for that RE is valid (e.g., if this bit indicates invalid information, the RE may be ignored), 7 bits of information indicating a total number of cache lines requested for that RE (e.g., such as indicating the number "n"), and 7 bits of information indicating the number of fetches already issued for that RE (e.g., such as to identify an address offset). In addition, each RE may include or store 7 bits plus 2 m bits of information identifying or corresponding to prefetches, such as 7 bits of information identifying the number of prefetches already issued (e.g., such as to be used as an address offset), and 2 m bits of information to identify the status of prefetches currently issued for this RE, where "m" represents the number of prefetches already issued.

At block 240 the REs are stored in a storage device in a RE first order (e.g., see RE first order 191). As noted above RE first order 191 may or may not be an order similar to and/or may include all or a subset of the order of the DRR first order 197. For example, controller 110 may store the REs generated at block 230 in storage device 120 via data path 112, such that each of RE1 141 through REM 145 includes identification described above with respect to block 230.

At block 260 a different second order is selected to submit the DRs. For example, DR11 151 through DRMQ 185 may be submitted as internal data reads to a central arbiter to read data (e.g., such as from a memory) in a second order that is a modification or change from the order in which the RE and/or DRRs are stored. More particularly, with respect to FIG. 1, controller 110 may submit the DRs in second different order 192 (as compared to DRR first order 197 and/or RE first order 191) via data path 113 to central arbiter 114 to read data as described herein.

Moreover, according to embodiments, the different second order for submitting the DRs may allow for simultaneous servicing of the REs. For instance, at block 270, a number of REs are simultaneously serviced which cause simultaneous servicing of a corresponding number of DRRs. For example, by submitting a number of DR11 151 through DRMQ 185 to central arbiter 114 to read data from memory 104, controller 110 may provide for simultaneous servicing of RE1 141 through REM 145, which in turn simultaneously services all or a subset of DRR1 131 through DRRL 135. Consequently, simultaneous servicing of the DRRs allows controller 110 to receive return data and transmit that return data to more than one data requester (e.g., such as via I/O interface 102 to DRR requester 103) in accordance with the DRRs received from the DRR requesters. Thus, the simultaneous servicing of DRRs allows for a more fair and equitable servicing and return of data to data requesters via I/O interface 102. In one example, all read entries corresponding to DRRs in FIFO 130 may be serviced before the first read entry corresponding to the first DRR in FIFO 130 is completely serviced.

At block 280 completed DRRs may be removed, such as by removing the top DRR (e.g., DRR1 131) from FIFO 130 once the servicing of that DRR has been completed. It is contemplated that a DRR storage structure other than a FIFO may be used in place of FIFO 130. In such a case, at block 280 completed DRRs may be removed from any DRR storage eligible for removal from the DRR storage device, once servicing of that DRR has been completed. More particularly after or upon completion of servicing of the DRs (e.g., such as DR11 151 through DR1N 155 of RE1 141), such as in a out-of-order servicing of DRs, the DRR corresponding to the RE whose DRs have been completed (e.g., the DRR corresponding to RE1 141, which may be DRR1 131) may be removed from DRR first order 197. Correspondingly, the RE whose DRRs have been completed (e.g., such as RE1 141 in the example given above) may be marked as invalid in storage device 120. Removal of completed DRRs is discussed further below with respect to FIG. 6.

Although FIG. 2 shows blocks 210, 220, 225, 230, 240, 260, 270, and 280 in sequence, it is considered the processes associated with those blocks, as described herein, may be performed in various appropriate orders, as described herein. Specifically, blocks 210 through 240 may be repeated during performance of any or all of blocks 260, 270, and/or 280. Additionally, for a specific DRR in FIFO 130, a request may be issued to the central arbiter for the DRR at the same time the RE is formed since it is known that each DRR will require at least one fetch.

In accordance with embodiments, an arbitration scheme may be used to choose REs stored in storage device 120 in an out-of-order sequence, such as different second order 192, from which to issue a DR by assigning priorities to various possible types of DRs to minimize the latency for returning data to a requester. Such an arbitration scheme may guarantee that a time slot to service a RE will be used if at least one RE has an eligible action to issue (e.g., such as an action to read data from memory). For example, each DR to request data from memory (e.g., such as any of DR11 151 through DRMQ 185) can be issued as a "prefetch" type or a "fetch" type of request to a central arbiter (e.g., such as central arbiter 114) to read data from a memory. For example, a "fetch" type of request may be a request that reads data from memory and returns that data to the data requester, while a "prefetch" type of request reads data from memory and stores that data in an intermediate memory so that that data can be returned to the requester during a subsequent "fetch" type of request that reads that data from the intermediate memory and returns that data to the requester. Thus, prefetches can help mask the latency associated with accessing main memory to obtain data, since there may be fewer restrictions or requirements to be met before issuing a prefetch than there are before issuing a fetch. According to an embodiment, prefetches only tell a central arbiter, such as central arbiter 114, to retrieve data from a first memory, such as main memory 105, and to store that data at a second memory, such as a centralized cache location like cache memory 106, and do not require actual returning of data to a requester. On the other hand, a fetch request may tell a central arbiter, such as central arbiter 114, to return data from a first memory, such as main memory 105, or from a second memory, such as a centralized cache location like cache memory 106, to a data requester such as requester 103. It should be noted that a fetch can be issued for a DR without having issued a prior prefetch for the DR (i.e. it may not be necessary to prefetch each DR but it may be required to fetch each DR).

Hence, fetch DR may be submitted to central arbiter 114 to read data from memory 104 and to return data to DRR requester 103, (e.g., where DRR requester 103 is satisfied by the data read from the location in memory that the DR read). Correspondingly, prefetch DR returns data from main memory 105 and stores it in cache memory 106 (e.g., where cache memory 106 represents a memory location from which the data can later be fetched). In other words, for a fetch to be eligible to issue, restrictions, or requirements must be satisfied that allow for the data retrieved by the fetch to be returned or transmitted to the requester. For example, in one case, adequate space in the outbound completion FIFO must exist and PCI-E ordering rules must be satisfied prior to issuing a fetch. Thus, during a time slot to service a DR, if no fetches are eligible to issue because rules for returning data to a requester may not be satisfied, a prefetch may be eligible instead since prefetches only tell a central arbiter (e.g., central arbiter 114) to retrieve data from a memory and store that data in a centralized or intermediate memory, and do not require rules be satisfied to actually return the data to a requester.

Although various arbitration schemes for assigning types of requests of data reads and priorities to types of requests of data reads are contemplated, embodiments include arbitration schemes that assign preference to fetches over prefetches regardless of which read entry the fetches exist for, since fetches actually return data to a requester.

According to an embodiment, a fetch priority pointer points amongst the REs in a "round robin sequence fashion" as described herein (e.g., such as a sequence described below for block 341 of FIG. 3) beginning at the RE pointed to by the fetch pointer, and moving in sequence through the REs until a fetch is identified which is eligible to issue in accordance with the restrictions or requirements of the system, such as in accordance with requirements of controller 110. Similarly, a prefetch priority pointer may move in a "round robin sequence fashion" as described herein (e.g., such as a sequence described below for block 351 of FIG. 3) amongst the REs beginning at the RE pointed to by the prefetch pointer and moving in sequence through the REs until an eligible prefetch is identified, such as a prefetch that meets the restrictions and requirements of the system, such as according to controller 110. Thus, if fetches have priority over prefetches as described above, if any fetch is eligible to issue, then the system will submit that fetch to read data from memory before submitting any prefetch. Alternatively, if no fetch is eligible to issue, then the system may submit any eligible prefetch to memory.

It is also contemplated that after a fetch or prefetch is submitted, the fetch and prefetch pointers may remain at the RE that the fetch or prefetch issued from, or may sequence to the next RE in RE first order 191, depending on the round robin sequence (e.g., such as according to controller 110 and/or a sequence described below for blocks 341 and/or 351 of FIG. 3). Similarly, if no fetch or prefetch was eligible to issue and/or issues, the fetch and prefetch pointers may remain at the RE that no fetch or prefetch issued from, or may sequence to the next RE in RE first order 191, depending move to the next RE in RE first order 191, depending on the round robin sequence (e.g., such as according to controller 110 and/or a sequence described below for blocks 341 and/or 351 of FIG. 3).

Additionally, once a DRR in FIFO 130 has been completely serviced, that DRR may be "popped" or removed from the FIFO. Although a completely serviced DRR may be removed from the top of FIFO 130 it is also contemplated that a completely serviced DRR may be removed from a location other than the top location in FIFO 130. Furthermore, once a completely serviced DRR is removed from FIFO 130, the RE stored in storage device 120 corresponding to the completely serviced DRR may be removed or freed-up or invalidated from storage device 120.

Accordingly, to accommodate "pop" DRRs as well as submit fetches and prefetches, a priority for pops indicator (e.g., such as an indicator where a "0" indicates any pop action will have lowest priority as compared to a fetch or prefetch, and a "1" indicates that any pop action will have highest priority) may be toggled (e.g., such as where the priority indicator is arbitrarily initiated as either a "0" or a "1", and then toggles between "0" and "1") to alternate causing a pop to be identified as the next action between highest and lowest priority each time a pop, fetch, or prefetch occurs. Such toggling of priority for pops can interleave the functionality of freeing up entries in FIFO 130 and storage device 120 for use by DRRs and REs (e.g., actions resulting from a pop) with issuing internal data reads to prefetch and/or fetch data.

In one example, controller 110 may use controller logic 116 to determine whether a pop priority is equal to one, in which case the controller will check REs stored at storage device 120 for REs that have been completely serviced and thus may be identified as a pop. If a pop exists and pop priority is equal to "1" controller 110 may remove the RE from storage device 120 and remove the corresponding DRR from FIFO 130. Controller 110 may then set pop priority equal to "0".

If controller 110 determines that pop priority is equal to zero, such as by using control logic 116, controller 110 may then determine whether a fetch is eligible, such as is described above. If a fetch is eligible, controller 110 may submit the fetch and set pop priority equal to "1". If a fetch is not eligible, as described above, controller 110 may determine whether a prefetch is available. If a prefetch is available, controller 110 may submit the prefetch and set pop priority equal to "1". If a prefetch is not available, controller 110 may toggle pop priority, such as by changing a current pop priority of "0" to "1", or changing a current pop priority of "1" to "0". This process may cause controller 110 to determine whether pop priority is 0 or 1 to perform a pop when pop priority is "1".

It can be appreciated that various algorithms and processes are contemplated for determining pop priority and alternating between fetches, prefetches, and pops. For instance, FIG. 3 is a flow diagram of a process for selecting between a fetch, a prefetch, and a pop, according to one embodiment of the invention. At block 305, the system, such as apparatus 100, sets pop priority equal to "0" or "1". Note that as described below the system, is contemplated to include apparatus 100, controller 110 (e.g., such as including or not including control arbiter 118 and/or control logic 116), and/or storage device 120.

At block 310, each DR such as DR11 151 through DRMQ 185 is identified or assigned as a fetch, a prefetch, and a pop. A pop DR corresponds to a RE identifying a DRR that has been completely serviced and can be removed from FIFO 130. Moreover, such identification of DRs as fetches, prefetches, and pops can be performed in real time by tracking information stored at RE1 141 through REM 145, such as using control logic 116 of controller 110. Such tracking is described further below.

At block 320 it is determined whether pops priority is equal to "1". If pop priority is not equal to 1 the process continues to block 324 where the control logic points to the RE pointed to by the fetch priority pointer. After block 324 the process continues to block 334 where it is determined whether the RE pointed to has a fetch DR. If the RE pointed to has a fetch DR at 334 then it is determined whether the fetch DR is eligible to issue at block 336. If at block 336 the fetch DR is eligible to issue then the process continues to block 340 where the fetch DR is issued. Block 340 is described further below with respect to FIG. 4. According to embodiments, a pop, as described with respect to block 330, may be performed simultaneously with block 340. Once the fetch DR is issued, the process continues to block 341 where a the fetch priority pointer is updated to point to the RE according to the round robin sequence.

The "round robin sequence" described herein may define a sequence where "Y" cache line reads (e.g., such as where Y is a real number or a positive integer) may be selected or programmed for each RE to cause controller 110 to attempt to fetch or prefetch the Y cache line size requests (e.g., such as cache line size supported by central arbiter 114) selected or programmed for a RE, when a fetch or prefetch pointer points to that RE. As noted, each DRR may request up to 4,000 bytes worth of data to be read in a "n" number of internal cache line size requests where "n" is the data read request size divided by the cache line size supported by central arbiter 114. So, n/Y represents the number times a fetch pointer would have to point to a RE to satisfy the DRR corresponding to that RE. According to embodiments, Y may be a number between 1 and 4,000 bytes/(the cache line size supported by the central arbiter). For example, it is contemplated that Y may be 1, 2, 4, 6, 8, or 12.

Thus, a fetch or prefetch may be issued or submitted to the central arbiter to read one cache line of data from the memory Y times for the RE that the fetch or prefetch issued from, before the fetch or prefetch priority pointer is sequenced to the next RE. Specifically, after the fetch DR is issued at block 340, in "round robin sequence" at block 341 may mean that if Y is satisfied (e.g., such as if Y cache line sized requests selected or programmed for the pointed to RE have been performed or attempted since the last time a fetch was issued from a different RE) then the fetch priority pointer is sequenced to the next RE in RE first order 191 (e.g., such as by sequencing from RE1, to RE2, . . . to REM, and then back up to RE1, and repeating). On the other hand, after the fetch DR is issued at block 340, if Y is not satisfied (e.g., such as if Y cache line size requests selected or programmed for the pointed to RE have not been performed or attempted since the last time a fetch was issued from a different RE) then the fetch priority pointer remains at the pointed to RE.

After block 341 the process continues to block 358 where the pop priority is set to "1". From block 358 the process returns to block 310.

Alternatively, if either the pointed to RE does not have a fetch DR at block 334 or the fetch DR is not eligible at 336, the process continues to block 342 where the control logic points to the next RE in sequence. Specifically, at block 342, the control logic points to the next RE in RE first order 191 (e.g., such as by sequencing from RE1, to RE2, . . . to REM, and then back up to RE1, and repeating). Next, at block 344 it is determined whether all the REs have been looked at to find an eligible fetch DR. If at block 344 all the REs have not been looked at to find an eligible fetch DR, then the process returns to block 334. Alternatively, if at block 334 all the REs have been looked at to find an eligible fetch DR, then the process continues to block 345 where the control logic points to the RE pointed to by the prefetch priority pointer. After block 345 the process continues to block 346 where it is determined whether the pointed to RE has a prefetch DR. If the pointed to RE has a prefetch DR, the process continues to block 348 where it is determined whether the prefetch DR is eligible to issue as a prefetch. If at block 348 it is determined that the prefetch DR is eligible, then the process continues to block 350 where the prefetch DR is issued. A further description of block 350 is included below for FIG. 5. After the prefetch DR is issued, the process continues to block 351 where a the prefetch priority pointer is updated to point to the RE according to the round robin sequence, such as is described above with respect to block 341.

Specifically, after the prefetch DR is issued at block 350, in "round robin sequence" at block 351 may mean that if Y is satisfied (e.g., such as if Y cache line size requests selected or programmed for the pointed to RE have been performed or attempted since the last time a prefetch was issued from a different RE) then the prefetch priority pointer is sequenced to the next RE in RE first order 191 (e.g., such as by sequencing from RE1, to RE2, . . . to REM, and then back up to RE1, and repeating). On the other hand, after the prefetch DR is issued at block 350, if Y is not satisfied (e.g., such as if Y cache line size requests selected or programmed for the pointed to RE have not been performed or attempted since the last time a prefetch was issued from a different RE) then the prefetch priority pointer remains at the pointed to RE.

After block 351 the process continues to block 358 where the pop priority is set to "1".

Alternatively, if at block 346 the pointed to RE does not have a prefetch DR or at block 348 the prefetch DR is not eligible to issue, then the process continues to block 352 where the control logic points to the next RE in sequence. Specifically, at block 352, the control logic may point to the next RE in RE first order 191 (e.g., such as by sequencing from RE1, to RE2, . . . to REM, and then back up to RE1, and repeating). After block 352, the process moves to block 354 where it is determined whether all the REs have been looked at to find an eligible prefetch DR. If all the REs have not been looked at to find an eligible prefetch DR, then the process returns to block 346. On the other hand, if all the REs have been looked at to find an eligible prefetch DR, then the process continues to block 356 where the pop priority is toggled. After the pop priority is toggled at block 356, the process returns to block 310. It is to be appreciated that block 356 may be performed when no fetches or prefetches are to be issued or submitted.

According to embodiments, the system, apparatus 100, and/or controller 110 may create and association or relationship between sequencing or pointing of the fetch and prefetch priority pointers so that the fetch priority pointer follows the sequence of REs of the prefetch priority pointer. For example, if the prefetch priority pointers points to RE2, then the fetch priority pointer follows in sequence of REs and points to RE2 at the next or near next future opportunity. This sequencing allows a prefetch to be quickly followed by a fetch of the prefetched data and increases efficiency, and speed to send the fetched data to the data requester, and decrease intermediate memory storage requirements (e.g., such as by allowing the storage size of the intermediate memory or cache memory 106 to be smaller). There may not be a requirement to issue a prefetch for every DR. If a fetch is issued for a DR without a prior prefetch to the same DR, then no prefetch will ever be issued for that DR.

Returning to block 320, if at block 320 pop priority is equal to "1", then the process continues to block 322 where it is determined whether the top RE is a pop RE. If at block 322, the top RE is a pop RE, the process continues to block 330 where the pop RE is popped. Block 330 is described further below with respect to FIG. 6. Also, according to embodiments, a fetch, as described with respect to block 340, may be issued simultaneously with block 330. After the pop RE is popped at block 330, the process moves to block 332 where pop priority is set to "0". After block 332, the process returns to block 310.

In addition, according to embodiments, block 322 may determine whether the top DRR is a pop DRR, and blocks 330 and 332 may correspond, so that a pop occurs to pop the top DRR that is a pop DRR and the corresponding RE.

Consequently, if at block 322 the top RE is not a pop, then the process returns to block 310.

It is contemplated that the process described above for FIG. 3 or any of the blocks thereof may be performed by the system, apparatus 100, such as including controller 110, central arbiter 114, and storage device 120, as well as other components of apparatus 110 as described herein. It may also be appreciated that although blocks 341 and 351 describe moving the fetch and prefetch priority pointers in "round robin sequence", and although blocks 341, 342, 351, and 352 describe moving a pointer by sequencing from RE1, to RE2 . . . to REM, and then back up to RE1, and repeating, various other sequences may be used for all or any of those blocks, such as an alternating or skipping RE entry sequence, a reverse order, a skipping round robin order, or another appropriate sequence.

Figure 3:
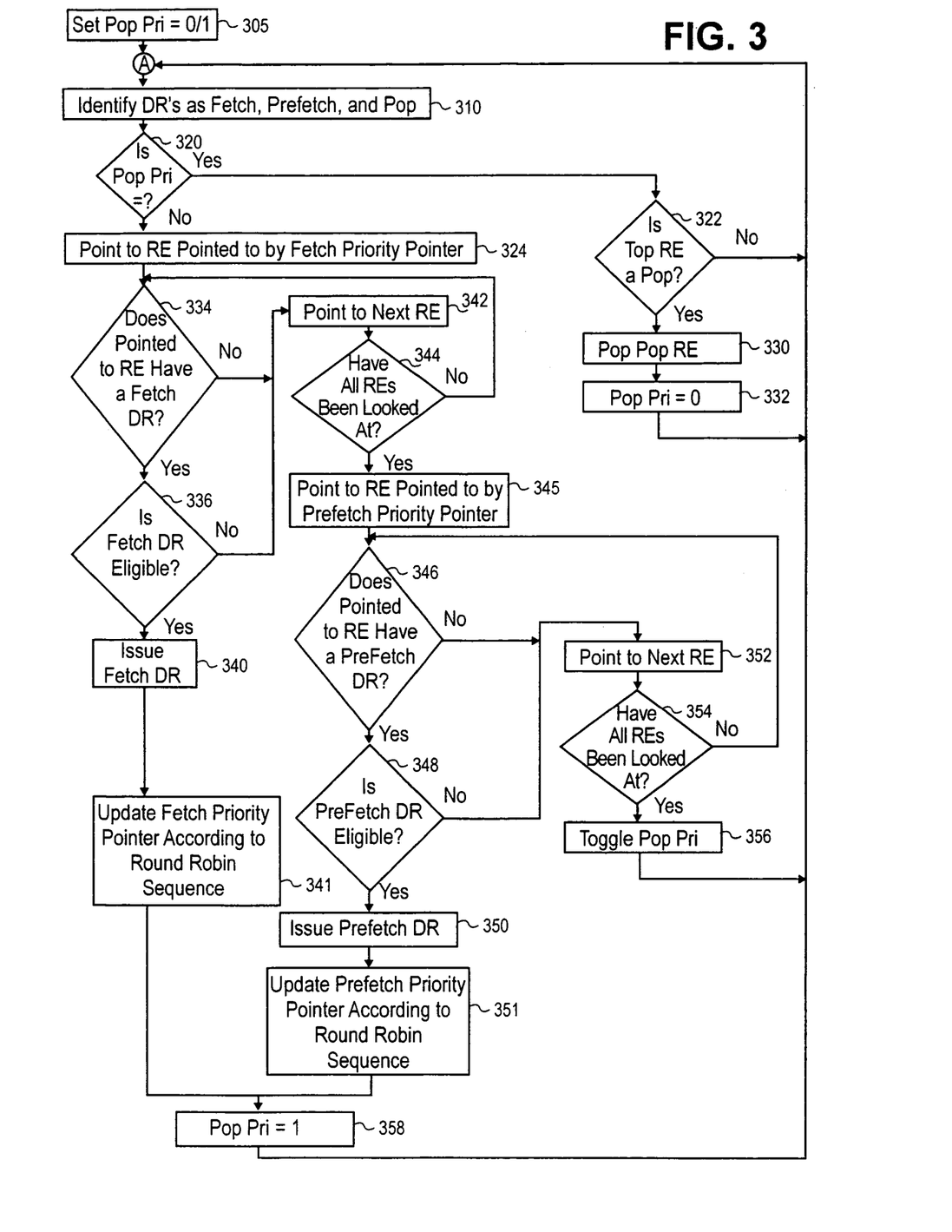
FIG. 3 is a flow diagram of a process for selecting between a fetch, a prefetch, and a pop, according to one embodiment of the invention.
Figure 4:
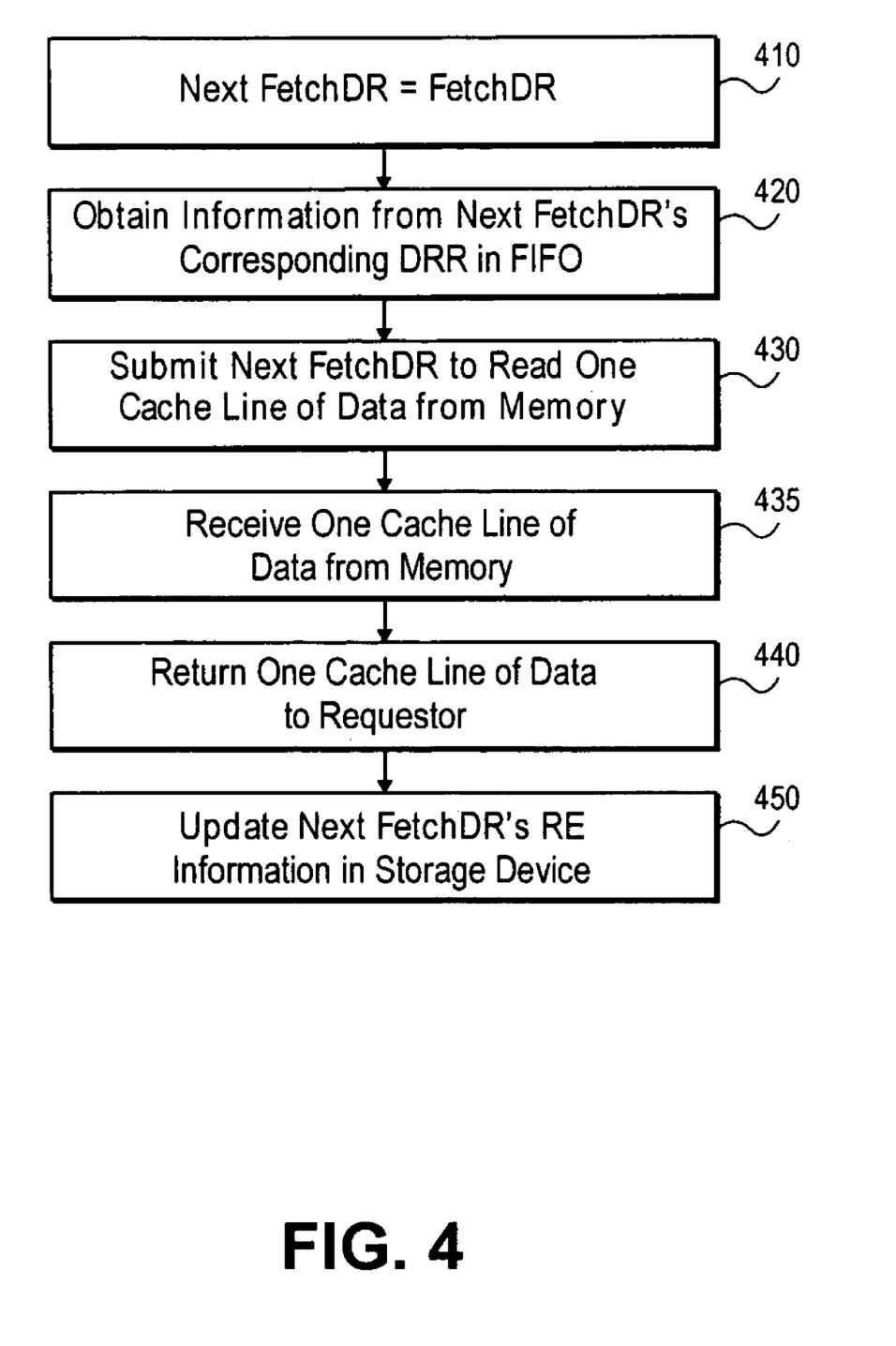
FIG. 4 is a flow diagram of a process for submitting a fetch to read data from memory according to one embodiment of the invention.

FIG. 4 is a flow diagram of a process for submitting a fetch to read data from memory according to one embodiment of the invention. FIG. 4 shows a process which may or may not represent block 340 of FIG. 3. At block 410 of FIG. 4, the currently eligible fetch DR is identified as the next fetch DR. For example, controller 110 may identify the eligible fetch DR as the next fetch DR. At block 420, information is obtained from the DRR in FIFO 130 corresponding to the next fetch DR. For example, controller 110 may obtain information from the corresponding DRR in FIFO 130 corresponding to the next fetch DRR. Information obtained from the corresponding DRR may include a memory address, a requester identification, a tag, and a byte enable. Address offset may be calculated based on the number of DRs that have already been issued from the RE.

At block 430, the next fetch DR is submitted to the central arbiter to read one cache line of data from the memory (e.g., such as cache line size supported by a central arbiter, such as central arbiter 114). For example, controller 110 may submit the next fetch DR via data path 113 to central arbiter 114 to perform an internal data read from either main memory 105 or cache memory 106.

At block 435, the one cache line of data from memory requested in the next fetch DR are received. For example, the one cache line of data may be received by controller 110 via data path 113 from memory 104.

At block 440, the one cache line of data received are returned to the data requester. For example, controller 110 may return the one cache line of data received from memory 104 via data path 111, via I/O interface 102, via an I/O link, and/or via an alternate appropriate data path to DRR requester 103. Thus, the received one cache line of data may be returned to a requester to satisfy the DR portion of the DRR requested by the requester.

At block 450, RE information in the storage device for the next fetch DR is updated. Specifically, the number of fetches issued is incremented. For example, controller 110 may update information for RE1 141 via data path 112 if RE1 141 is the RE for which the next fetch DR is part of.

Figure 5:
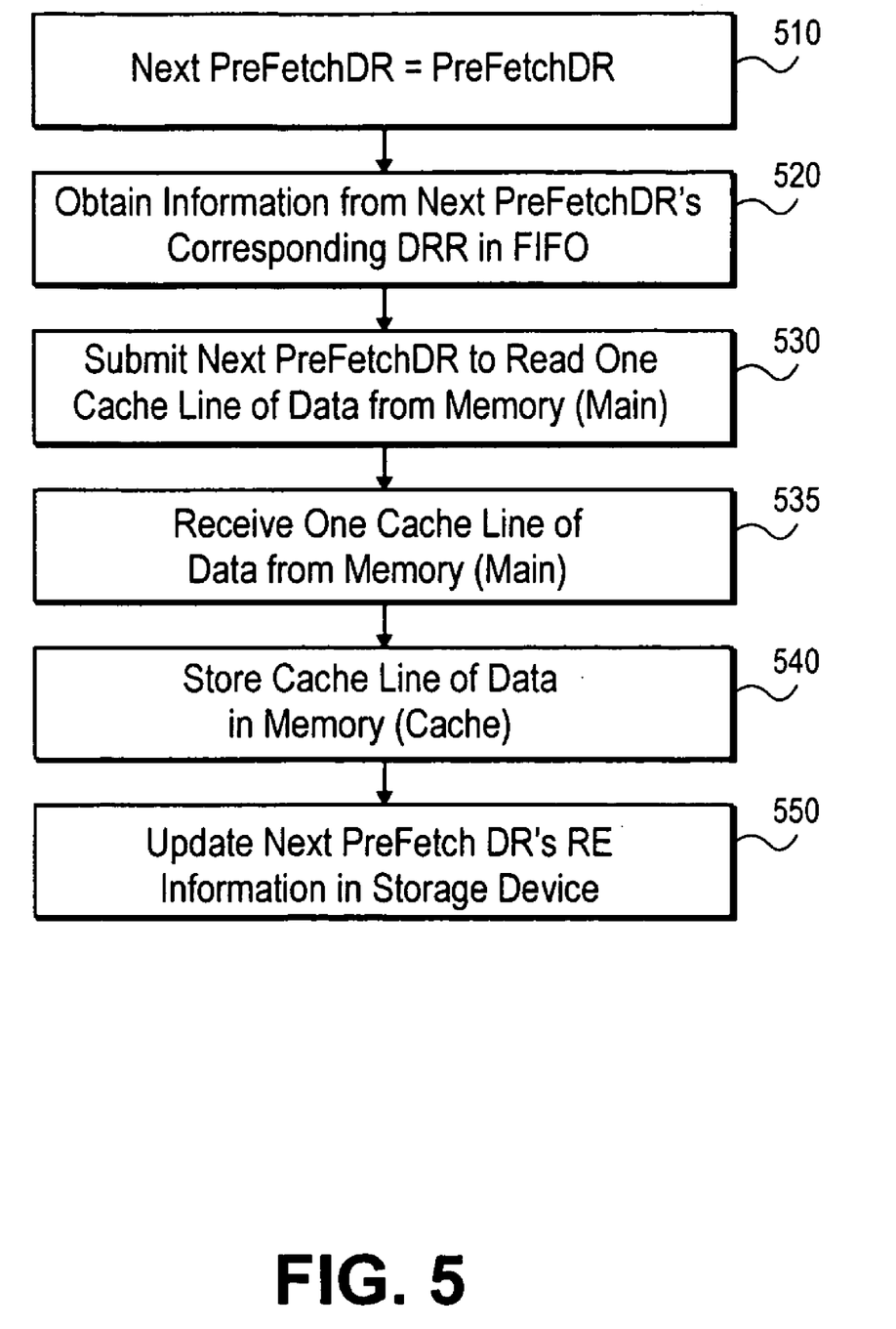
FIG. 5 is a flow diagram of a process for submitting a prefetch to read data from memory, according to one embodiment of the invention.

Similarly, FIG. 5 is a flow diagram of a process for submitting a prefetch to read data from memory, according to one embodiment of the invention. FIG. 5 may or may not be a process for fulfilling block 350 of FIG. 3. At block 510, the currently eligible prefetch DR is identified as the next prefetch DR. The identification at block 510 may be performed by controller 110. At block 520, information from the DRR in FIFO 130 corresponding to the prefetch DR is obtained. For example, controller 110 may obtain such information as described above with respect to block 420 of FIG. 4.

At block 530, the next prefetch DR is submitted to the central arbiter to read one cache line of data. For example, controller 110 may submit the next prefetch DR via data path 113 to central arbiter 114 to read one line of cache data.

At block 535, one line of data are received from memory. For example, central arbiter 114 may receive one line of data from main memory 105 via data path 115, where the one line correspond to the next prefetch DR submitted.

At block 540, the one cache line of data received is stored in memory. For example, central arbiter 114 may store the one cache line of data received from memory in accordance with the next prefetch DR in cache memory 106 via data path 115. Thus, the one cache line of data in accordance with the next prefetch DR may be stored in cache memory for subsequent fetching to satisfy the DRR to which the next prefetch DR corresponds.

At block 550, the RE information in the storage device corresponding to the next prefetch DR is updated, such as is described above with respect to block 450 of FIG. 4. Specifically, the count of the number of prefetches issued is incremented.

Hence, FIGS. 3–5 describe a process for submitting DRs to perform or issue fetches and prefetches of data from memory according to next DR 195 such as in the order of second order 192 to perform out of order servicing of data read requests such as DRR1 131 through DRRL 135 which correspond with RE1 141 through REM 145. Moreover, such out of order servicing provides for simultaneous servicing of those DRR which correspond to RE1 141 through REM 145.

Figure 6:
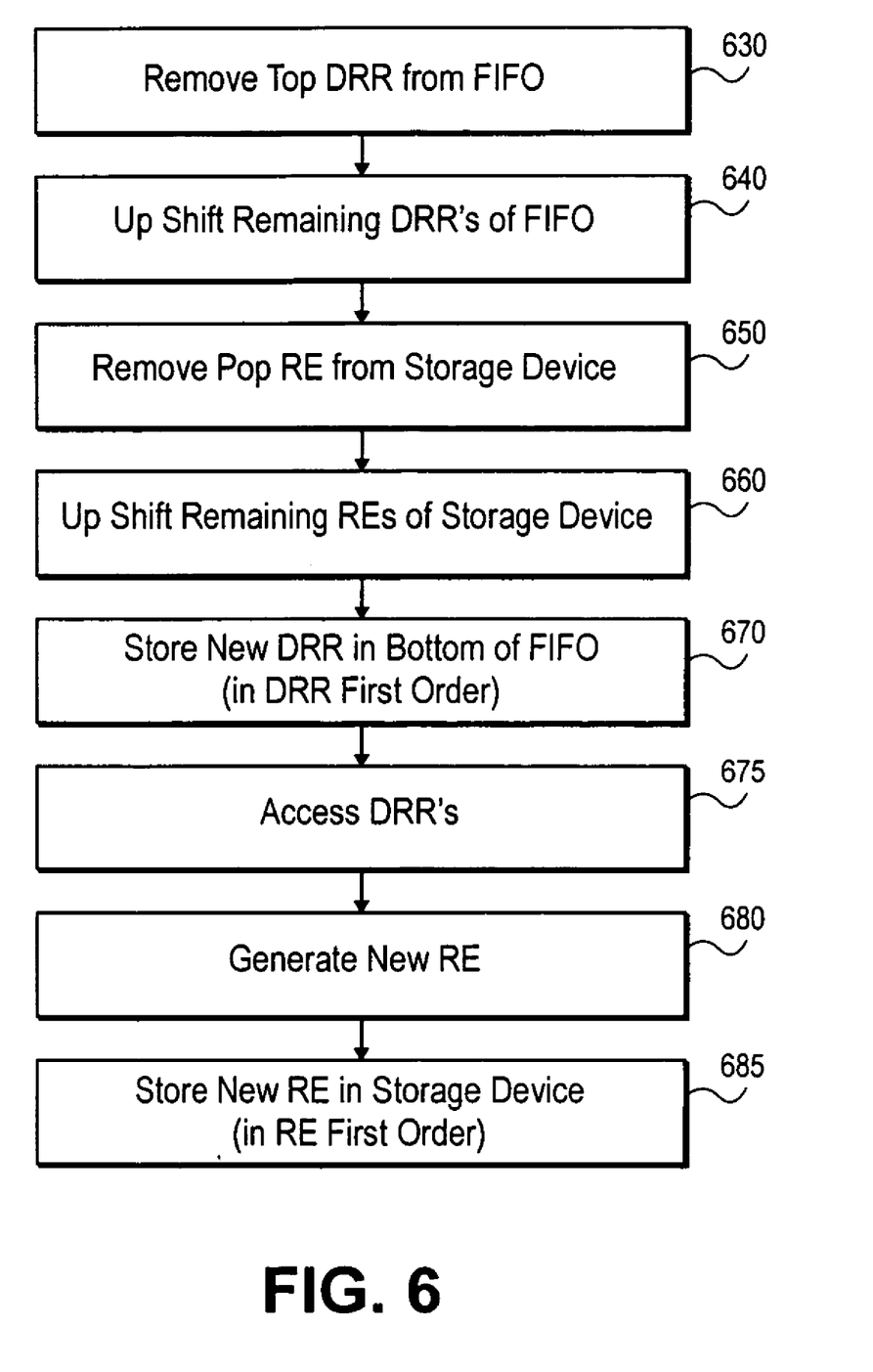
FIG. 6 is a flow diagram of a process to pop a data read request, according to one embodiment of the invention.

FIG. 6 shows a flow diagram of a process to pop a data read request, according to one embodiment of the invention. For example, FIG. 6 may or may not be a process for performing block 330 of FIG. 3. At block 630, the top DRR is removed from FIFO 130. For example, DRR1 131 may be popped from FIFO 130. It is considered that popping DRRs may occur with or without instructions from controller 110 via data path 111.

According to embodiments, block 630, may include determining whether the pop RE (e.g., such as described above with respect to block 280 of FIG. 2, or block 322 of FIG. 3) corresponds to the top DRR of FIFO 130 (e.g., such as DRR1 131).

It is also contemplated that controller 110 and/or the DRR storage structure may allow a DRR other than the top DRR of the DRR storage structure to be popped for embodiments where a DRR storage structure other than a FIFO is used, as described above with respect to block 280 of FIG. 2. In such a case, a non-top entry such as DRR2 132 may be popped from the DRR storage structure. More particularly, such a case may occur due to out of order sequencing of RE1 141 through REM 145, such as if RE2 142 is completely satisfied prior to satisfaction of RE1 141. Thus, in this example above, RE2 142 is completely satisfied and is identified as a pop RE which causes DRR2 132 to be popped from the DRR storage structure.

Next, at block 640, the remaining DRR in FIFO 130 are up-shifted, such as so that FIFO 130 may be loaded from the bottom at DRRL 135. Alternatively, according to embodiments where a DRR storage structure other than a FIFO is used, the DRR storage structure may be loaded at a location other than the bottom, DRRL 135, such as in an embodiment where the storage structure and/or controller 110 allow the storage structure to be loaded at the currently popped location. Thus, in the example where DRR2 132 is popped, in this embodiment, the next DRR from a DRR requester may be inserted into the space where DRR2 132 was removed, thus becoming a new DRR2 132. In any event, the reloaded sequence of DRRs, once the new DRR is stored in the DRR storage device or FIFO 130 will be a new DRR first order.

At block 650, the pop RE is removed or invalidated from the storage device. For example, controller 110 may remove whichever of RE1 141 through REM 145 corresponds to the pop RE from storage device 120, via data path 112. According to embodiments, the pop RE need not be the top RE in storage device 120 (e.g., such as RE1 141) such as described above with respect to popping other than the top DRR from the DRR storage structureMoreover, in cases where RE first order 191 does not correspond with DRR first order 197, popping the top DRR of FIFO 130 may cause a RE other than the top RE of storage device 120 to be popped. Thus, controller 110 may remove the RE entry from storage device 120 for whichever RE has been completely serviced during the out of order sequencing of DR11 151 through DRMQ 185.

Next, at block 660, the remaining REs of the storage device are up-shifted. For example, controller 110 may up-shift RE2 142 through REM 145 of storage device 120 via data path 112 if RE1 141 corresponds to the removed pop RE. Alternatively, a pointer that designates the top RE may be updated to reflect removal of a RE. Note that as described above with respect to block 640, it may not be necessary to shift the remaining REs in storage device 120 if components of the system of apparatus 100 allow for removal of REs in various orders.

For embodiments where RE1 141 through REM 145 are stored in storage device 120 in the same order that their corresponding DRR1 131 through DRRL 135 are stored in FIFO 130, DRRs are popped from the top entry of FIFO 130, such as to remove DRR1 131, and corresponding REs are popped from the top entry of storage device 120, such as to remove RE1 141. Then, the DRRs in FIFO 130 are up-shifted and the REs in storage device 120 are up-shifted so that the next DRR received via I/O interface 102 is entered to DRRL 135. This upshifting may simply involve updating of pointers that designate the top entry of each storage device. Prior to, during, or after storing the next DRR to DRRL 135, controller 110 may select a DRR from FIFO 130 to replace REM 145 after the up-shift or REs in storage device 120. It can be appreciated that various sequences and shifting are contemplated for popping, shifting, and storing new entries in FIFO 130 and storage device 120.

At block 670, a new DRR is stored in the bottom of FIFO 130. For example, FIFO 130 may store the next DRR received via I/O interface 102 in DRRL 135. Note that block 670 may correspond to the process described above with respect to block 220.

At block 675, the DRRs in FIFO 130 are accessed, such as to select a DRR to represent with a RE entry in storage device 120. For example, controller 110 may access the DRRs in FIFO 130 via data path 111 to determine which DRR to generate a RE for to store in storage device 120. Block 675 may correspond to the process described above with respect to block 225.

At block 680, a new RE is generated. For example, once controller 110 selects which DRR of FIFO 130 to generate a new RE for, controller 110 may then select which information from DRR is to be stored with and generate new information to be stored with the RE entry in storage device 120. The process of block 680 may correspond to the process described above with respect to block 230. It should be noted that a fetch or prefetch request may be issued for the DRR simultaneously with RE generation of the corresponding RE since it is known that each DRR will require at least one DR.

At block 685, the new RE is stored in the storage device. For example, controller 110 may store the RE information identified above with respect to block 680 in REM 145 of storage device 120. Note that the functionality of block 685 may correspond to that described above with respect to block 240.

The following logic equations (such as may be implemented by control arbiter 118 and/or control logic 116) and explanations are examples of how an arbitration scheme may identify whether each DR is a pop, fetch, or prefetch, such as is described above with respect to block 310 of FIG. 3. For example, a data read or DR may be identified as a pop if "entry_valid_pop" is equal to "1" for the logic equation:

$$\text{entry\_valid\_pop} = ((\text{num\_f\_lines\_rem} = 0) || ((\text{num\_f\_lines\_rem} = 1) \text{ \& entry\_valid\_f})) \text{ \& entry\_eq\_top} \quad (1)$$

Thus, the "entry_valid_pop" equation allows the top entry of the receive FIFO to be popped out once its request has been completely serviced. Alternatively, the "entry_eq_top" restriction is not required for embodiments where a DRR storage structure other than a FIFO is used, and a completely serviced DRR other than the top DRR could be removed from the DRR storage structure.

Also, a data read may be identified as a fetch if "entry_valid_f" is equal to "1" in the logic equation:

$$\text{entry\_valid\_f} = \text{entry\_valid \& order\_ok \& cpl\_queue\_avail \& (num\_f\_lines\_rem} > 0) \text{ \& (! pf\_pend) \& (! max\_pend\_limit\_reached)} \quad (2)$$

Therefore, the "entry_valid_f" equation indicates that for an entry to be eligible to issue a fetch: (1) there must be an active request in the out-of-order entry, (2) PCI-E ordering requirements must be satisfied (i.e., all previous writes and completions must already have gone out), (3) there must be room in the outbound completion FIFO to accept the completion data, if such a requirement exists, (4) there must still be cachelines remaining that need to be requested from the central arbiter (e.g., central arbiter 114), (5) there must be no prior prefetch pending for the cacheline, and (6) we must not exceed the number of allowable entries in the centralized cache.

Next, a data read may be identified as a prefetch if "entry_valid_pf_ok" or if "entry_valid_pf_a" is equal to "1" in either logic equation:

$$\text{entry\_valid\_pf\_ok} = (\text{num\_pf\_lines\_rem} > 0) \text{ \& (! max\_pend\_limit\_reached)} \quad (3)$$

$$\text{entry\_valid\_pf\_a} = \text{entry\_valid\_pf\_ok \& order\_ok \& (! max\_pend\_limit\_reached)} \quad (4)$$

Here, the "entry_valid_pf_ok" equation indicates that for an entry to be eligible to issue a prefetch: (1) there must still be cachelines remaining that need to be requested from the central arbiter (e.g., central arbiter 114) and (2) we must not exceed the number of allowable entries in the centralized cache. A second prefetch category implemented with the "entry_valid_pf_a" equation allows preference to be given to entries that satisfy ordering requirements. Since a prefetch reserves one of a limited number of entries in the centralized cache, it makes sense to give priority to prefetches that are more likely to be quickly followed by a corresponding fetch once space becomes available in the outbound completion FIFO.

Finally, according to embodiments, the above equations may be tracked, such as by control logic 116 of control arbiter 118 tracking those equations in real time, for each entry in the out-of-order storage structure. At a more global level, the winner within the fetch category is determined based on round-robin priority; the same happens within each of the prefetch categories. Finally, the overall winner is determined by giving preference to requests that facilitate the return of data most quickly; thus a fetch is always selected over a prefetch, and a pop is selected over both fetches and prefetches on alternate turns.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
    accessing a plurality of data read requests received from an input/output (I/O) interface and stored in a first order;
    generating a plurality of read entries from the plurality of data read requests, the plurality of read entries identifying a plurality of data reads to read data to service the plurality of data read request;
    storing the plurality of read entries in the first order according to the order the data read requests are received in over time;
    selecting a different second order to submit the plurality of data reads;
    servicing a data read of a first read entry;
    then servicing a data read of a second read entry prior to completing servicing the data read request corresponding to the first read entry; and
    removing a completed data read request from the first order after completion of servicing of the completed data read request, wherein the completed data read request is the first received data read request.

2. The method of claim 1 wherein servicing includes:
    submitting the plurality of data reads to a memory according to the different second order; and
    receiving return data in accordance the data read requests.

3. The method of claim 1 wherein selecting includes:
    identifying each data read as a pop, a fetch, or a prefetch;
    determining whether at least one data read identified as a fetch is eligible to issue as a fetch;
    identifying a next data read to service from the plurality of data reads as an eligible data read identified as a fetch, if a data read identified as a fetch is eligible to issue as a fetch;
    determining whether at least one data read identified as a prefetch is eligible to issue as a prefetch, if at least one data read identified as a fetch is not eligible;
    identifying a next data read to service from the plurality of data reads as an eligible data read identified as a prefetch, if at least one data read identified as a prefetch is eligible to issue as a prefetch.

4. The method of claim 3, wherein a pop removes a data read request from the first order after completion of servicing of the data read request, a fetch returns data from a main memory or a cache memory to a data read requester, and a prefetch returns data from main memory to a cache memory.

5. The method of claim 3, wherein determining whether at least one data read identified as a fetch is eligible includes reviewing a selected fetch read entry of the at least one data read identified as a fetch a selected number of times until either a data read identified as a fetch and eligible to issue as a fetch is found, or until each of the at least one data read identified as a fetch for the fetch selected read entry is reviewed at least once; and determining whether a data read identified as a prefetch is eligible includes reviewing a selected pre fetch read entry of the at least one data reads identified as prefetches the selected number of times until either a data read identified as a prefetch and eligible to issue as a prefetch is found, or until each of the at least one data reads identified as prefetch for the selected prefetch read entry is reviewed at least once.

6. The method of claim 5, wherein submitting the next data read includes obtaining from the stored data read request a memory address, a requester identification, a tag, and a byte enable flag.

7. The method of claim 3, further comprising:
submitting the next data read to a central arbiter to read data from a first memory;
receiving return data identified by the data read request; and
one of writing the return data to a second memory and returning the return data to a requester of a data read request that the next data read satisfies.

8. The method of claim 1 wherein the plurality of data read request are received from one of a device that supports one of an input/output (I/O) specification and a peripheral components interconnect express (PCI-E) specification.

9. The method of claim 1 wherein the plurality of read entries correspond to a subset of the plurality of data read requests.

10. The method of claim 1 wherein each data read is to read at least one cache line sized read of data defined by a central arbiter and the data read request is to request a total number of cache lines requested by a data read requester.

11. The method of claim 1 wherein each read entry includes information identifying: (1) whether the read entry has valid data, (2) a total number of cache lines requested by a data read request, and (3) an identification of a portion of the total number of cache lines already serviced by data fetches.

12. An apparatus comprising:
a storage structure to store a plurality of read entries in a first order, the plurality of read entries derived from a plurality of data read requests to be received from an input/output (110) interface and to be stored in the first order, the plurality of read entries to identify a plurality of data reads to service the plurality of data read request; and
a controller coupled to the storage structure to submit the plurality of data reads in a different second order,
wherein each read entry includes information identifying: (1) whether the read entry has valid data, (2) a total number of cache lines requested by a data read request, and (3) an identification of a portion of the total number of cache lines already serviced by data fetches.

13. The apparatus of claim 12, wherein the different second order is submitted to read data from a plurality of memories.

14. The apparatus of claim 12, further comprising a control arbiter to service a data read of a first read entry, then servicing a data read of a second read entry prior to completing servicing the data read request corresponding to the first read entry.

15. The apparatus of claim 12, further comprising logic to implement an arbitration scheme to select a next data read to service from the plurality of data reads.

16. The apparatus of claim 12, further comprising logic to derive each read entry from a corresponding data read request, wherein each read entry includes at least one data read and the at least one data read is sufficient to complete servicing of the corresponding data read request.

17. A system comprising:
a FIFO to store a plurality of data read requests in a in a first order, the data read requests to be received from an input/output (110) interface;
a storage structure to store a plurality of read entries in the first order, each read entry derived from a data read request, wherein each read entry includes information identifying: (1) whether the read entry has valid data, (2) a total number of cache lines requested by a data read request, and (3) an identification of a portion of the total number of cache lines already serviced by data fetches;
a controller coupled to the storage structure to submit to a central arbiter to read data from a memory a plurality of data reads from the read entries to service a data read of a first read entry, and then servicing a data read of a second read entry prior to completing servicing the data read request corresponding to the first read entry.

18. The system of claim 17, wherein the FIFO includes compact register file memory and the storage structure includes standard memory cell logic.

19. The system of claim 17, wherein the plurality of data reads are to be submitted to a digital communication chip.

20. The system of claim 17, wherein the controller includes control logic to implement an arbitration scheme to service the read entries in a different second order from an main memory and an cache memory.

* * * * *